United States Patent [19]
Kupersmith et al.

[11] 4,099,180
[45] Jul. 4, 1978

[54] GEOGRAPHIC GAIN TIME CONTROL

[75] Inventors: Murray Kupersmith, Commack; Curtis W. Symansky, Freeport, both of N.Y.

[73] Assignee: General Signal Corporation, Rochester, N.Y.

[21] Appl. No.: 773,624

[22] Filed: Mar. 2, 1977

[51] Int. Cl.² .............................................. G01S 9/56
[52] U.S. Cl. ............................ 343/6.5 R; 343/100 LE
[58] Field of Search ........ 343/6.5 R, 6.5 LC, 100 LE

[56] References Cited

U.S. PATENT DOCUMENTS

| | | | |
|---|---|---|---|
| 3,349,402 | 10/1967 | Foster | 343/100 LE X |
| 3,680,095 | 7/1972 | Evans | 343/7 A |
| 3,836,964 | 9/1974 | Evans | 343/7 A |
| 3,860,924 | 1/1975 | Evans | 343/100 LE X |
| 4,021,805 | 5/1977 | Effinger et al. | 343/100 LE X |
| 4,050,070 | 9/1977 | Beno et al. | 343/6.8 LC |

*Primary Examiner*—T.H. Tubbesing
*Attorney, Agent, or Firm*—Milton E. Kleinman; Stanley B. Green

[57] ABSTRACT

Apparatus is provided for modifying a conventional target locating system in which targets respond to an interrogation signal by transmitting a reply, and the target location is deduced from the azimuth from which a reply is received and the delay between the interrogation signal and the reply. The improvement includes a controllable attenuator coupling the receiving antenna to the target locating system which is controlled to selectively discriminate against selected range cells at selected azimuths. In a preferred embodiment, digital circuitry is relied upon to control the attenuator, and the identication of the range cells to be discriminated against is stored in a digital memory.

6 Claims, 4 Drawing Figures

GEOGRAPHIC GAIN TIME CONTROL

FIELD OF THE INVENTION

The present invention relates to improvements in target locating systems of the type in which the target includes a transponder.

BACKGROUND OF THE INVENTION

As the density of air traffic has increased, it has become necessary to provide a supervising authority to control the altitude, heading and speed of aircraft, especially in terminal areas. Of course, the supervising authority, to intelligently control any particular aircraft, must have knowledge of other aircraft in the vicinity of the controlled aircraft. To provide the supervisor with such knowledge, various target locating systems have been employed. One such system which has come into widespread use is based upon an interrogator-transponder operation. Using this apparatus, an interrogation signal is transmitted at periodic intervals. Each target (aircraft) to be located carries a transponder and responds to the interrogation pulse by transmitting a particularly identifiable responsive signal. Associated with the supervising authority is a target locating system which includes an antenna scanning 360° in azimuth. When a reply is received, the location of the replying aircraft is determined from two quantities: the azimuth from which the reply signal is received, and the delay between interrogation and reply. Systems of this type are in widespread use and, in unperturbed situations, operate quite effectively.

It has been found, however, that operation of this apparatus in the vicinity of urban areas leads to the presence of false or spurious replies, that is, replies which, in fact, do not relate to the presence of an actual aircraft or at least replies which do not indicate true target location. These false replies have generally been attributed to multi-path effects caused by reflections of the signals from man-made and/or natural constructions. For example, where there are $n$ reflectors, a single aircraft can generate an indication of $n$ aircraft. If there are actually two aircraft in the vicinity (with $n$ reflectors) the number of aircraft presented to the controller could vary anywhere from $2n$ to $2n^2$, depending upon reflector geometry. If instead of two aircraft there are a hundred aircraft in an area with three large reflectors, the apparatus could indicate the presence of anywhere from 300 to 900 aircraft. Although the upper limit is highly unlikely, nevertheless, several hundred spurious replies will virtually prevent any effective control from the ground.

For example, FIG. 1 is a schematic illustration of a typical problem wherein a target locating system including an antenna 5 is attempting to locate the position of aircraft in its vicinity, such as aircraft 10 in the presence of a reflector 11. The apparatus generates interrogation signals, and typically these include a pulse coded signal comprising at least a pair of pulses, of approximately 30 nanoseconds duration. At least one of these pulses is omni-directionally transmitted and, at least another pulse, which is separated from the first pulse by about 3 to 20 microseconds, is directionally transmitted. The aircraft carried transponder is arranged to be suppressed for about 35 microseconds upon receipt of only one of the two pulses. The transponder, if it receives both the pulses, transmits a reply and then suppresses itself for about 100 microseconds. The target locating apparatus 5 assumes that the target transmitting a reply is at the same azimuth from which the reply was received. The target range is determined by the time delay between the interrogation signal and the reception of the reply. Transponder suppression will, for instance, prevent a reply if the directionally transmitted pulse traverses the path $c$–$b$ in less than 35 microseconds. On the other hand, a reply will be generated if this pulse traverses the path in a longer time. The reply will be received either through the main antenna beam, if reflected, or through the antenna side or back lobe, if not reflected. If the reflector is a sufficiently efficient reflector or the reply power is sufficient to exceed the power threshold through the antenna back or side lobe, a spurious reply will be received.

Although it is clear that the spurious responses are generated by multi-path effects, the precise mechanism or mechanisms which produce the spurious replies has not been ascertained.

It is therefore an object of the invention to provide apparatus which can be used to modify the existing equipment so as to minimize or eliminate the spurious responses. It is another object of the present invention to provide such apparatus for modifying existing systems with the minimum disruption and expense. It is a further object of the invention to provide apparatus for modifying existing systems which is compatible with a wide variety of existing systems.

It is yet another object of the invention to provide a target locating apparatus which can be used in the vicinity of man-made and/or natural signal reflectors which at the same time selectively discriminates against false replies.

SUMMARY OF THE INVENTION

The present invention meets these and other objects by providing apparatus for modifying existing target locating systems. Such target locating systems operate based upon the existence of a transponder on a target (aircraft) to respond to an interrogation signal with a reply which, when received, allows the position and heading of the aircraft to be determined. Typically, the target locating systems employ a pair of interrogating pulses, one omni-directional pulse and a second pulse which is directively transmitted so that only targets in the vicinity of the azimuth in which the second pulse is transmitted will be triggered to respond. Furthermore, the transponders, in order to minimize false replies, are suppressed for a predetermined period following an interrogation; in typical apparatus, this predetermined period is 100 microseconds. The present invention provides a controllable attenuator coupled between the receiving antenna and the known target locating system. The controlled attenuator is controlled as a function of antenna azimuth and time to selectively discriminate against certain range cells.

The apparatus for controlling the attenuator, in a preferred embodiment, includes a digital storage array having memory location for each identifiable range cell in the antenna pattern. Each memory location has stored therein a quantity indicative of the desired attenuation so as to selectively discriminate against replies in certain range cells.

In operation, a pair of counters operate to determine, at any instant in time, the particular azimuth, and the particular range cell from which a reply is expected. If, during a survey made prior to operation, the particular range cell has disclosed the possibility of spurious reply, the memory location has stored therein a quantity equivalent to attenuation sufficient, along with the receiving characteristic, to discriminate against any spurious replies.

In this fashion the spurious replies will not be recognized by the equipment, while at the same time, true replies can be effectively received.

BRIEF DESCRIPTION OF THE DRAWINGS

The invention will now be described with reference to the attached drawings in which.

DETAILED DESCRIPTION OF THE DRAWINGS

Before describing the invention, it will be helpful to describe one mechanism by which spurious replies are produced.

Figure 1:
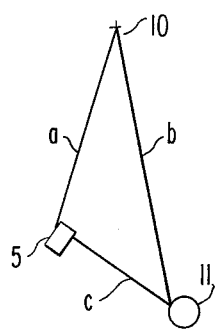
FIG. 1 is a schematic showing illustrating the generation spurious responses.

As shown in FIG. 1, where the target locator is attempting to locate a target 10, a reflector 11 is positioned so that, when the antenna 5 points to the reflector 11 the target located at 10 receives a interrogation signal, thus generating a reply. In order to generate a spurious response, however, the receiving apparatus must receive the reply. That is possible either over the direct path $a$, in which case the reply would be received on the side or back lobe of the antenna pattern, or over the reflected path $b-c$, in which case the reply would be received over the antenna's main beam.

Because of the suppression features at the transponder, the reflected path ($b-c$) must delay the directional signal for a period of time slightly longer than the suppression time of the transponder. For example, if $a = 12$ miles, $b = 3$ miles and the angle $a-b$ is 170°, then $c = 15$ miles. Assuming the radiated signal travels 6 microseconds per mile, the directional pulse is received at the transponder 36 microseconds after receipt of the omni-pulse, 1 microsecond after expiration of the suppression time, insuring a reply by the transponder.

The reply will not represent a spurious response unless it is effectively received at the interrogator (i.e., unless the reply's power level at the interrogator is above the interrogator threshold). A reply can be received either by traversing the reflected path ($b-c$) or the direct path (a). In the latter case, the reply would have to be received over the antenna's back lobe, and in the former case, the reply would again have to be reflected by the structure 11. Calculations show that the signal strength of the reply makes it possible for the interrogator to respond to a reply traversing either path.

To illustrate the practical nature of this problem, Table I illustrates five reported true, and five reported false locations for an aircraft during 38 seconds of its flight in approaching Kennedy Airport in New York City.

TABLE I

| True Location | | False Location | |
|---|---|---|---|
| Range | Azimuth | Range | Azimuth |
| 12.6 | 358.9 | 12.6 | 325.9 |

TABLE I-continued

| True Location | | False Location | |
|---|---|---|---|
| Range | Azimuth | Range | Azimuth |
| 12.1 | 357.3 | 15.0 | 169.4 |
| 11.8 | 355.4 | 11.8 | 347.8 |
| 11.4 | 354.8 | 11.4 | 023.6 |
| 11.1 | 350.9 | 15.6 | 198.4 |

Reproduced below, in Table II, is similar data, taken 5 minutes later for another aircraft, illustrating three reported true and three reported false locations for the second aircraft. Visual inspection of the area surrounding Kennedy Airport allows identification of man-made structures which comprise the reflectors at 169°, 263°, and 325°.

TABLE II

| True Location | | False Location | |
|---|---|---|---|
| Range | Azimuth | Range | Azimuth |
| 12.9 | 0.4 | 15.8 | 168.4 |
| 12.5 | 359.6 | 27.3 | 263.0 |
| 11.8 | 354.4 | 11.0 | 023.4 |

Figure 2A:
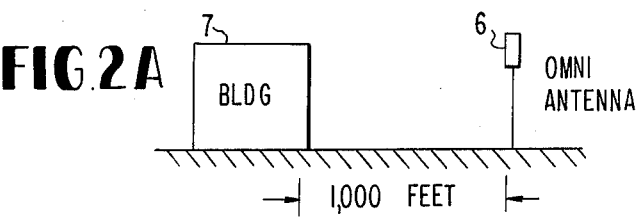
FIGS. 2A and 2B illustrate, respectively, relative locations of transmitting antenna and reflector and radiated signal that may also result in spurious responses; and, FIG. 3 is a block diagram of the apparatus of the invention.
Figure 2B:
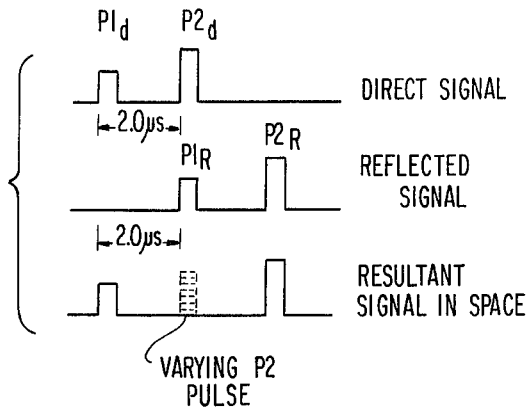

Thus, for reflectors which are situated so that the reflected signal path is at least 35 microseconds longer than the direct signal path, false replies can be generated. However, there is another potential mechanism for generating false replies which does not require the reflector to be spaced from the antenna by the constraint set forth above. One interrogator system employs a directionally transmitted pulse $p1$, followed by an omni-directionally transmitted pulse $p2$, 3 microseconds later. Suppression at the transponder occurs if the omni-directional pulse is received less than 3 microseconds after receipt of the directional pulse. This occurs if the directional pulse travels over a non-direct path, and therefore, the omni-pulse is received with less than the transmitted spacing. Consider, for example, the situation illustrated in FIG. 2A, where an omni-directional antenna 6 is located 1,000 feet from the reflector such as building 7. In FIG. 2B, the direct signal is shown to comprise pulses $p1_d$ and $p2_d$, separated by 2 microsecond interval. The signal reflected from building 7 is a pair $p1_r$ and $p2_r$ delayed by 2 microseconds. The reflected signal is shown on the second line of FIG. 2B wherein the same pulse pair is delayed by 2 microseconds due to the reflection. The third line of FIG. 2B shows the resultant signal which could be received by an aircraft. As illustrated, the delay period between the first and second pulses is now greater than 2 microseconds with the result that the transponder may not be suppressed and may indeed generate a false reply. Cancellation occurs as an interaction between $p2_d$ and $p1_r$ due to the random phase in the $rf$ stage.

At least four potential solutions to false replies are:
(1) target elimination by software/programming;
(2) receiver side lobe suppression;
(3) interrogator transmitted power programming;
(4) interrogator receiver sensitivity programming.

The first mentioned solution has at least two disadvantages which outweigh its potential advantages. It would lower system throughput by requiring additional processing; and, it would be extremely costly in light of the existing software which would have to be modified.

The main disadvantage to receiver side lobe suppression is the additional significant cost it would impose for modification of the antenna and to the receiver as well as to the antenna pedestal. In total, this solution would be extremely costly, requiring significant system modification and result in lower performance.

The third solution is based upon reducing interrogator output power at those azimuths including significant reflectors. However, since large reflectors are very efficient, the reflected signal is almost as strong as the direct path signal. As a result, if sufficient attenuation is provided to eliminate spurious replies such attenuation would also significantly decrease the range for aircraft at that azimuth. Furthermore, attenuators capable of handling peak power on the order of 2 to 3 kilowatts, which would be required for this function, are still in the developmental stage.

Figure 3:
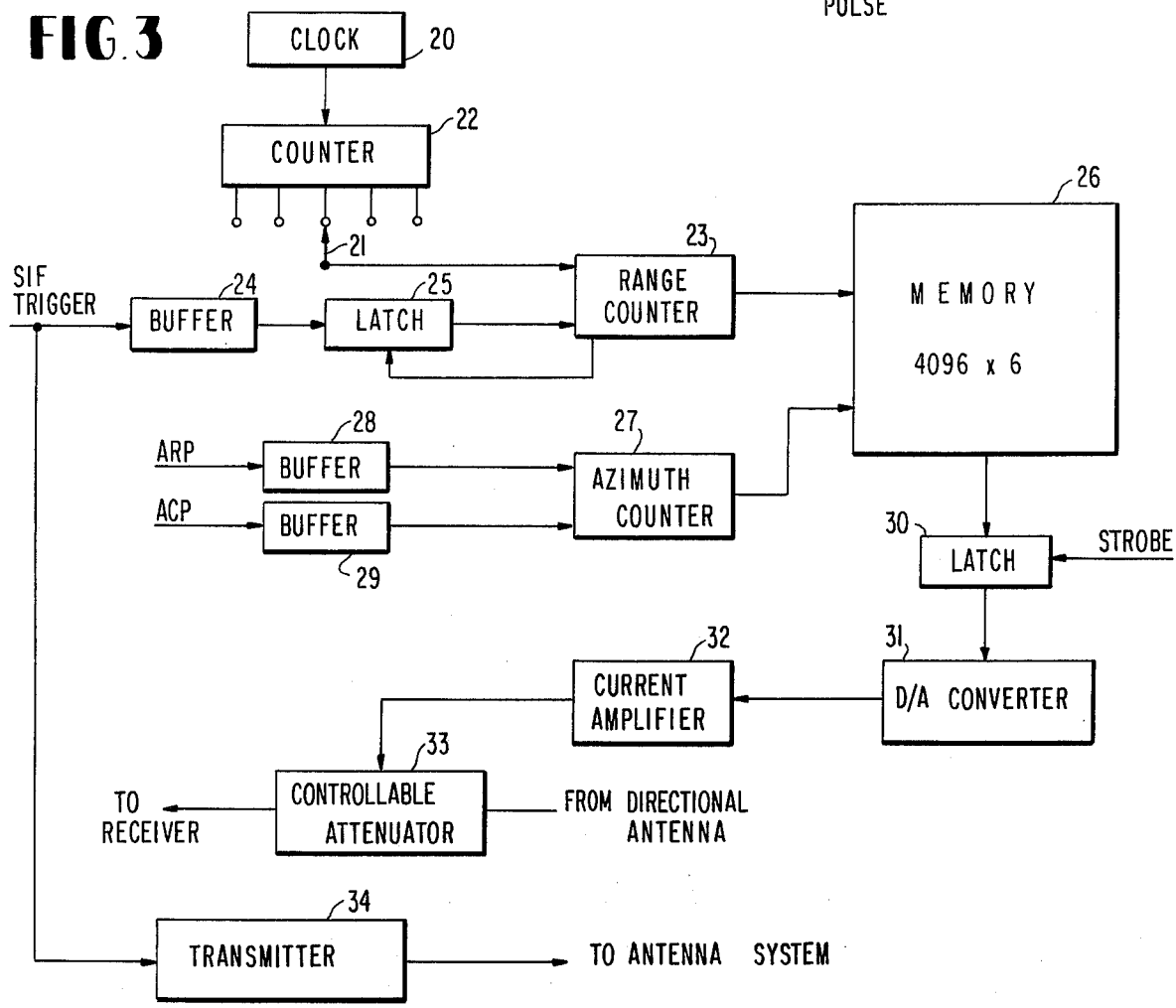

FIG. 3 is a block diagram of the inventive apparatus. The invention is based on receiver sensitivity programming. Power margin calculations have shown that, assuming the spurious reply is received over the antenna side or back lobe, a significant power margin exists between true replies (received over the main lobe) and spurious replies. The goal of the apparatus is to selectively decrease receiver sensitivity (by selectively adding attenuation) so that true replies will exceed the modified sensitivity but false replies will not.

A clock 20 drives a counter 22 having a plurality of outputs corresponding to different range limits. The switch 21 selects the desired range and couples the associated output of counter 22 to a range counter 23. Another input of the range counter is provided synchronous with the interrogation signal (termed the SIF trigger) through a buffer 24 and latch 25. An output of the range counter is provided to a digital memory 26. Memory 26 is arranged as a multi-word memory (for example 4,096) with six bits per word. The azimuth counter 27 has applied to it two inputs through buffers 28 and 29, respectively. Buffer 28 couples the ARP signal while buffer 29 couples the ACP signal. The antenna system develops a reference pulse each time the antenna moves in azimuth through a reference position; this is the azimuth reference pulse (ARP). At the same time, the azimuths are divided into a suitable number of azimuth wedges, and as the antenna moves from one wedge to the next, an azimuth change pulse (ACP) is generated. The combination of ARP and ACP thus define the instantaneous antenna position. For example, if there are 64 azimuth wedges, each would be 5.625° wide and the present azimuth could be determined by multiplying the number of ACP's received after the ARP by the quantity 5.635°. The output of azimuth counter 27 provides a second addressing input for the memory 26. Thus, each memory word is associated with a particular range cell at a selected azimuth. Memory 26 is adapted to read out of its storage the word stored at the address defined by the range counter 23 and azimuth counter 27. This output is provided to a latch 30 whose output is coupled to a D/A converter 31. The output of D/A converter 31 is provided as an input to a current amplifier 32. The memory output, stored in latch 30, is a digital representation of a particular attenuation level. The D/A converter 31 converts this to an analog voltage which, when applied to current amplifier 32, produces a current level related to the desired attenuation. This current level is then coupled to the controllable attenuator 33 which is connected between the receiving antenna and the receiver to provide the desired amount of attenuation. Controllable attenuator 33 can, for instance, comprise a PIN diode, or other device well known to those skilled in the art.

Based on the foregoing, the apparatus disclosed in FIG. 3 operates as follows. At any given azimuth, an interrogation signal is provided by the transmitter 34. The trigger signal, coupled through buffer 24 and latch 25, resets the range counter 23 to begin counting. The clock 20 and counter 22 continuously provide range equivalent pulses. At any instant of time, for any particular count contained in the azimuth counter 27 and the range counter 23, a preselected range cell at that azimuth is identified and the corresponding word is read out of memory 26, stored in latch 30, converted by converter 31 and amplifier 32 to a current level related to the desired attenuation for that particular range cell at that azimuth. The controllable attenuator 33, responsive to the current provided by the amplifier 32 then adds desired attenuation to the return signal, if any, before it is applied to the receiver. If necessary, or desirable, a different attenuation level can be associated with each different range cell at each different azimuth of the antenna, thus enabling the apparatus to selectively discriminate from replies as a function of range cell and azimuth.

Although several methods can be used to determine suitable attenuation levels for different range cells, one manner of determining the desired attenuation for any particular range cell at a selected azimuth is to perform a survey by allowing a typical aircraft to fly a predetermined pattern and determine the response received therefrom. Since the aircraft's pattern is known, the true replies can be readily determined and thus separated from the false replies. Selective attenuation is indicated for each of the range cells from which false replies are received. Generally, it may be possible to estimate the desired attenuation although it is also possible to measure the received energy in a false reply and thus provide sufficient attenuation so that the received signal, at the output of the attenuator, is below the receiver sensitivity.

For the arrangement shown in FIG. 1, with the target at 10 and a reflector at 11, and employing realistic power levels, the transponder on the aircraft replies with approximately 500 watts (+ 57 dBm). The signal received at the ground antenna will be attenuated by a path loss of 118.6 dB. If we assume that the directional antenna has a gain of 26 dB with a front-to-back attenuation of 27 dB, the signal strength at the interrogator input port is −62.6 dBm. With the interrogator at Kennedy Airport, the STC attenuation at 15 miles (⅓ of the total round trip) is 14 dB. Correspondingly, the equivalent input power level to the interrogator is −77 dBm. Since typical receiver sensitivity is −86 dBm, the received signal will be easily detected even though it is received through the antenna's back lobe. Thus, the target, at a heading of 0° and a range of 12 miles, is also reported at a heading of 170° with a range of 15 miles, as a direct result of the reflector 11. If we further assume that reflectors exist at 263° and 12 miles, the same aircraft 10 will also be reported at 253° and 21.4 miles.

Employing the example given earlier, of a false target reported because of the reflector 11, we can, employing typical parameters, determine the power margin at the receiver for both direct and reflected targets. The result of typical computations is shown in Table III below.

TABLE III

|  | Reflected Target - 12 Miles | Direct Targets | |
| --- | --- | --- | --- |
|  |  | 12 Miles | 15 Miles |
| Transponder | +57 dBm | +57 | +57 |

TABLE III-continued

|  | Reflected Target - 12 Miles | Direct Targets | |
| --- | --- | --- | --- |
|  |  | 12 Miles | 15 Miles |
| Power Path Loss | −119 dB | −119 | −121 |
| Antenna Gain | +23 | +23 | +23 |
| Elevation Factor | — | −2 | −2 |
| Front-to-Back Attenuation | −27 | — | — |
| STC Curve | −13 | −16 | −16 |
| Equivalent Input Power | −79 dBm | −57 dBm | −56 dBm |
| Receiver Sensitivity | −87 dBm | −87 dBm | −87 dBm |
| Power Margin | 8 dB | 30 dB | 31 dB |

If, for the range cell corresponding to the reflected target shown in column 1 in Table III, the attenuator provides 10 dB attenuation, the reflected target signal will be below the sensitivity and thus will be eliminated. However, the direct targets at both 12 and 15 miles have sufficient power margins so that their replies will be easily detected Of course, this attenuation level would be provided for this particular range cell at this particular azimuth. Similar calculations might indicate the necessity for the same or slightly different attenuation levels for other range cells at this azimuth.

Although a preferred embodiment of the invention has been described in which digital circuitry is employed to access a memory or storage device containing appropriate attenuation determining parameters for a particular range cell, those skilled in the art will understand that the invention need not be so limited. Other equivalent digital or analog techniques could be employed.

What is claimed is:

1. In an interrogator transponder system for locating targets carrying a transponder, triggered into operation by receipt of interrogation signals, with a receiver coupled to an antenna for determining target position as a function of range and azimuth as the locus of transmission of said interrogation multi-path effects to generate spurious target positions comprising:

a controllable attenuator coupled to said receiver in a signal path from said antenna, memory means with a plurality of storage locations corresponding to a plurality of range cells, each of said storage locations storing a quantity related to the ability of multi-path effects to generate a spurious reply at a corresponding range cell, addressing means for addressing different storage locations of said memory means, and memory output means for controlling said controllable attenuator in accordance with a quantity read from an addressed storage location.

2. The apparatus of claim 1 which includes means for transmitting an interrogation signal sweeping in azimuth as a function of time and in which said addressing means addresses different storage locations in synchronism with the changing azimuth of said interrogation signal.

3. The apparatus of claim 1 in which the said addressing means includes means to address different storage locations as a function of time.

4. The apparatus of claim 1 in which said interrogation signals interrogate different range cells as a function of time at a given azimuth and in which said interrogation signals are swept in azimuth in which said addressing means includes means to address storage locations corresponding to different range cells at a given azimuth as a function of time, and to address different storage locations in synchronism with different azimuths of said interrogation signal.

5. In an interrogator-transponder system including an interrogation signal transmitter sweeping a search volume at different azimuths with a receiver detecting target position as a function of azimuth of a reply and time delay after transmission of an interrogation signal which is subject to generation of spurious target positions due to multi-path effects, a method of reducing such multi-path effects comprising the steps of:

providing a controllable attenuator in a signal path to said receiver, providing a memory storing, in locations corresponding to different range cells, quantities related to detected ability for generation of spurious target positions at said range cells, reading locations of said memory in accordance with azimuthal position of said interrogation signal, and controlling said attenuator to provide attenuation corresponding to quantities read from said memory.

6. The method of claim 5 in which said reading step comprises reading different storage locations of said memory as a function of time subsequent to transmission of said interrogation signal.

* * * * *